United States Patent

Kawasaki et al.

[11] Patent Number: 5,959,805
[45] Date of Patent: *Sep. 28, 1999

[54] AIR-BEARING ELECTRO-MAGNETIC HEAD SLIDER

[75] Inventors: Goro Kawasaki; Katsuhide Sone; Tohru Iwamoto, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/719,901

[22] Filed: Sep. 25, 1996

Related U.S. Application Data

[63] Continuation of application No. 08/317,741, Oct. 4, 1994, abandoned.

[30] Foreign Application Priority Data

Dec. 7, 1993 [JP] Japan ................................. 5-306791

[51] Int. Cl.[6] ............................................. G11B 5/60
[52] U.S. Cl. ............................................. 360/103
[58] Field of Search ............................................. 360/103

[56] References Cited

U.S. PATENT DOCUMENTS

| | | | |
|---|---|---|---|
| 4,673,996 | 6/1987 | White | 360/103 |
| 5,062,017 | 10/1991 | Strom et al. | 360/103 |
| 5,349,487 | 9/1994 | Egawa et al. | 360/103 |
| 5,359,481 | 10/1994 | Egawa et al. | 360/103 |
| 5,377,063 | 12/1994 | Taniguchi et al. | 360/103 |
| 5,430,591 | 7/1995 | Takeuchi et al. | 360/103 |
| 5,546,251 | 8/1996 | Egawa et al. | 360/103 |
| 5,751,516 | 5/1998 | Hideo et al. | 360/103 |

FOREIGN PATENT DOCUMENTS

| | | |
|---|---|---|
| 60-101781 | 6/1985 | Japan . |
| 2-246067 | 10/1990 | Japan . |
| 4-228157 | 8/1992 | Japan . |

*Primary Examiner*—Robert S. Tupper
*Attorney, Agent, or Firm*—Greer, Burns & Crain, Ltd.

[57] ABSTRACT

An air-bearing head slider for supporting an electromagnetic transducer opposite to a rotating recording media or magnetic disk. A slider body has a surface having a leading or air-entry side and a trailing or air-delivery side. Two rails are provided on the surface of the slider body and has floating surfaces opposite to the rotating magnetic disk for generating a floating force. The two side rails extend along a direction of air flow generated by the rotation of the magnetic disk and define a relatively shallow groove between these two rails. The groove has a width-enlarged portion at which the width of the groove is enlarged, so that a negative pressure is generated in such a manner that the slider body is attracted to the rotating magnetic disk. Inclined surfaces are formed on the air-entry sides of the floating surfaces of the rails. An inclination angle of the inclined surface is not more than 3° and not less than 0.5° and a length of the inclined surface is not less than 50 μm and not more than a half of a length of the rails in the direction of air flow.

19 Claims, 10 Drawing Sheets

AIR-BEARING ELECTRO-MAGNETIC HEAD SLIDER

This is a continuation of application Ser. No. 08/317,741, filed on Oct. 4, 1994 now abandoned.

BACKGROUND OF THE INVENTION

1. Field of the Invention

The present invention relates to an air-bearing head slider of an electromagnetic transducer in which at least two rails for generating a floating force are provided on a surface opposed to a magnetic recording medium in the direction of an air flow generated by the rotation of the magnetic recording medium.

2. Description of the Related Art

Recently, there is a demand for downsizing electromagnetic disk units. In the case of an air-bearing electromagnetic head slider, the floating height has been reduced so as to accomplish high density recording. When the floating height of the electromagnetic head slider is reduced, it becomes necessary to stabilize an amount of floating height. Even when the dust is rising in the head gap, it is necessary for the electromagnetic head to be kept floating in a stable manner. On the other hand, in order to enhance the portability and reliability, it is necessary to enhance the shock resistance property.

At present, the most widely used electromagnetic head slider is the one referred to as a "Winchester" type. The Winchester type electromagnetic head slider is provided with two linear rails, and an inclined surface is formed on the air flow entry side of a floating surface of each rail. This electromagnetic head slider has a circumferential speed dependency, so that an amount of floating height of the head is increased in accordance with an increase of circumferential speed with respect to the rotating media.

On the other hand, where a rotary actuator is used, the seeking operation of the electromagnetic head is conducted by a circular arc motion of the actuator. Thus, a YAW angle is changed in accordance with a position of the head with respect to the recording medium in the radial direction, so that an amount of floating height is also changed by this YAW angle.

Therefore, conventionally, the YAW angle dependency of the rotary actuator and the circumferential speed dependency of the magnetic head slider are combined in such a manner that an amount of floating height is stabilized.

Stabilization of the head floating height is not limited to the approach described above. For example, in Japanese Unexamined Patent Publication (Kokai) No. 60-101781 and U.S. Pat. No. 5,062,017 disclose a technique in which the stabilization of the floating height is realized by devising a configuration of the electromagnetic head slider.

According to Japanese Unexamined Patent Publication (Kokai) No. 4-228157, there is provided an electromagnetic head slider in which the configuration of the head slider is devised so as to reduce and stabilize the amount of the floating height, the electromagnetic head slider being characterized in that: a shallow groove is formed between the rails; a groove width extending section is formed in at least a portion of the groove, in which the groove width is increased when a view is taken from the air entry side to the air delivery side; and a negative pressure is generated in the groove so that the magnetic head slider is attracted to the magnetic recording medium side.

In the above-mentioned conventional negative pressure slider, a pair of rails for generating a floating force are provided on a surface opposed to the magnetic recording medium in the direction of an air flow generated by the rotation of a magnetic recording medium. Inclined surfaces are respectively provided on the floating surfaces of the rails on the air flow entry side.

A shallow groove is formed between these rails. In the groove, there is provided a groove width extending section, the width of which is extended when a view is taken from the air entry side to the air delivery side.

In the air-bearing electromagnetic head slider constructed in the manner described above, when an air flow is generated by the rotation of a magnetic recording medium in the direction on the floating surfaces of the rails, a floating force is generated in which the electromagnetic head slider is moved in a direction away from the magnetic recording medium. That is to say, a floating force is generated so that the electromagnetic head slider is moved upward. At the same time, in the groove extending section of the groove, the flowing air is expanded, and a negative pressure is generated, by which the electromagnetic head slider is attracted to the magnetic recording medium side, that is, the magnetic head slider is moved downward. Therefore, the electromagnetic head slider floats to a height at which both forces are balanced. Then the electromagnetic head slider stops at the balanced position.

However, in the above construction, the inclination angles of the inclined surfaces of the electromagnetic head slider are so small in the same manner as those of the inclination surfaces of other electromagnetic head sliders, and the lengths of the inclined surfaces in the air flow direction are small.

Therefore, when the dust adheres to an air flow entry portion of the electromagnetic head slider (especially on the floating surface of the rail), the amount of floating height of the electromagnetic head slider is greatly affected by a negative pressure generated in the rear of the adhering dust (in the downstream), so that the amount of floating height is reduced, which causes a problem in the viewpoint of stability of the floating height. Further, concerning the shock resistance property, the above construction is not competent.

SUMMARY OF THE INVENTION

It is an object of the present invention to provide an electromagnetic head slider in which an amount of floating height can be sufficiently stabilized even when the amount of floating height is small.

Another object of the present invention is to provide an electromagnetic head slider, the shock resistance property of which is high.

According to the present invention, there is provided an air-bearing head slider for supporting an electromagnetic transducer opposite to a rotating recording media or magnetic disk, said slider comprising: a slider body having a surface opposite to said rotating magnetic disk, said surface having a leading or air-entry side and a trailing or air-delivery side; at least two rails provided on said surface of the slider body and having floating surfaces opposite to said rotating magnetic disk for generating a floating force, said at least two side rails extending along a direction of air flow generated by the rotation of said magnetic disk and defining a relatively shallow groove between these two rails; said groove having at least one width-enlarged portion at which the width of said groove is enlarged when a view is taken from said air-entry side to the air-delivery side, so that a negative pressure is generated by said width-enlarged portion in such a manner that said slider body is attracted to said rotating magnetic disk; and inclined surfaces formed on the air-entry sides of the floating surfaces of said rails, an inclination angle of said inclined surface being not more than 3° and not less than 0.5° and a length of said inclined surface being not less than 50 μm and not more than a half of a length of said rails in the direction of air flow.

According to another aspect of the present invention, there is provided an air-bearing head slider for supporting an electromagnetic transducer opposite to a rotating recording media or magnetic disk, said slider comprising: a slider body having a surface opposite to said rotating magnetic disk, said surface having a leading or air-entry side and a trailing or air-delivery side; at least two rails provided on said surface of the slider body and having floating surfaces opposite to said rotating magnetic disk for generating a floating force, said at least two side rails extending along a direction of air flow generated by the rotation of said magnetic disk and defining a relatively shallow groove between these two rails; and each of said rails having an edge portion on the floating surface at the air-delivery side being chamfered in such a manner that a length of said chamfered portion in the air-flow direction is not less than 6 μm (not more than 50 μm) and a depth of said chamfered portion is not less than 0.27 μm (not more than 45°).

DETAILED DESCRIPTION OF THE PREFERRED EMBODIMENTS

Figure 1:
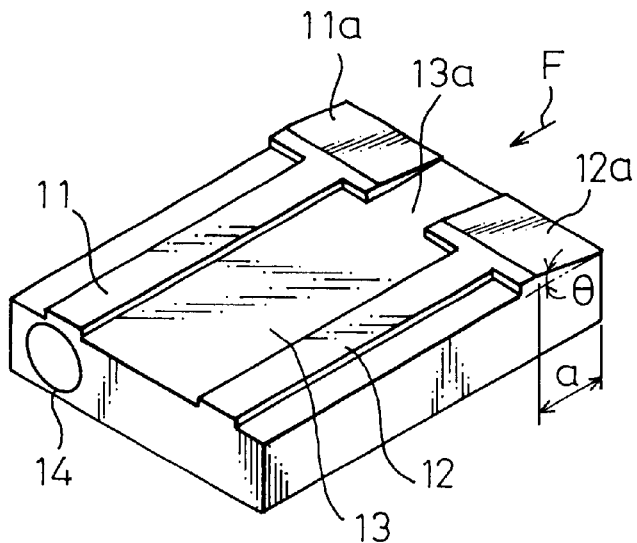
FIG. 1 is a perspective view showing the principle of the invention.

FIG. 1 is a perspective view showing the principle of the present invention. In FIG. 1, numerals 11, 12 are rails for generating a floating force, which are provided on a surface opposed to the magnetic recording medium (not shown) in the direction of an air flow F generated by the rotation of the magnetic recording medium. Inclined surfaces 11a, 12a are respectively provided on the entry side of air flow F of the floating surfaces of the rails 11, 12. The inclined surfaces 11a, 12a are formed in such a manner that the inclination angle θ is not more than 3° and the length "a" in the air flow direction F is not less than 50 μm.

A shallow groove 13 is formed between the rails 11 and 12. In the groove 13, there is provided a groove width extending section 13a, the width of which is extended when a view is taken from the air entry side to the air delivery side. In this connection, numeral 14 is a thin film electromagnetic head formed integrally with the electromagnetic head slider.

In the electromagnetic head slider shown in FIG. 1, when an air flow is generated by the rotation of a magnetic recording medium in the direction F on the floating surfaces of the rails 11, 12, a floating force is generated in a direction in which the electromagnetic head slider is separated from the magnetic recording medium. At the same time, in the groove extending section 13a of the groove 13, the flowing air is expanded, and a negative pressure is generated, by which the electromagnetic head slider is attracted to the magnetic recording medium side.

Therefore, the electromagnetic head slider floats to a height at which both forces are balanced. Then the head slider stops at the balanced position. The inclined surfaces 11a, 12a are composed in such a manner that the inclination angle θ is not more than 3° and the length "a" in the air flow direction is not less than 50 μm. Accordingly, even when a dust adheres onto the inclined surfaces 11a, 12a, such a dust may easily be flown toward the downstream side with respect to the rotation of the magnetic recording media.

Therefore, a decrease of the floating height of the electromagnetic head slider is negligibly small. Therefore, although an amount of floating height is small, an excellent stabilizing property can be provided.

Figure 2:
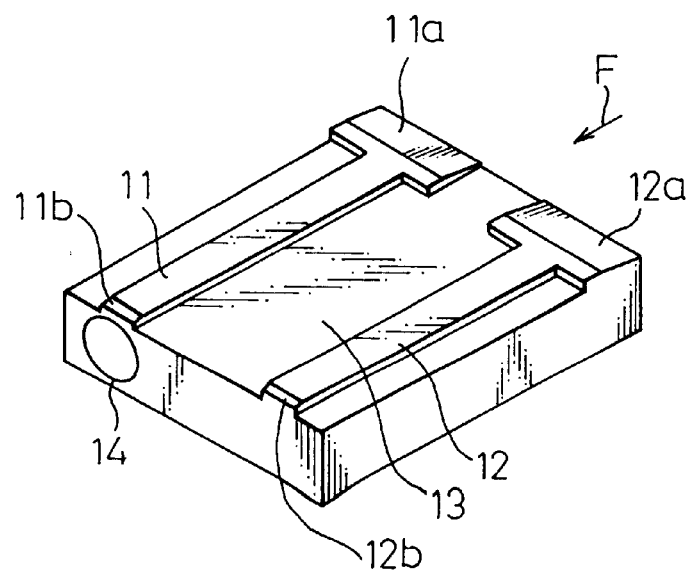
FIG. 2 is a perspective view showing the principle of another invention.

The construction shown in FIG. 2 has many points in common with the construction shown in FIG. 1. Like parts in each of FIGS. 1 and 2 are identified by the same reference character, and the explanations are omitted here.

Figure 3:
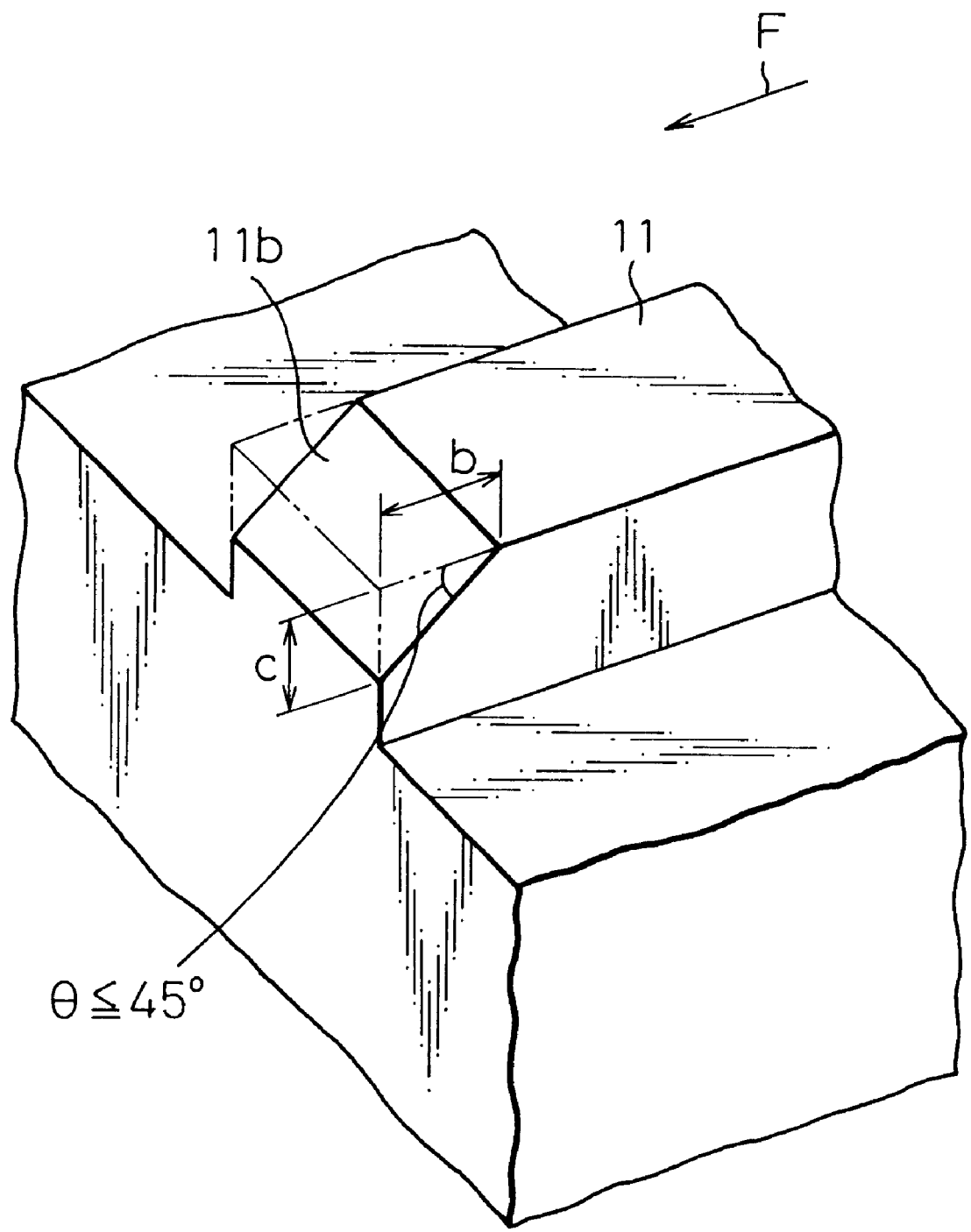
FIG. 3 is a partially enlarged view of FIG. 2.

The characteristics of the construction shown in FIG. 2 are that the chamfered portions 11b, 12b are provided at the edge portions of the floating surfaces of the rails 11, 12 on the air delivery side as illustrated in FIG. 3, wherein the length "b" of the chamfered portion in the air flow direction is not less than 6 μm (not more than 50 μm) and the depth "c" is not less than 0.27 μm. The angle θ is not more than 45°. In FIGS. 2 and 3, the chamfered portions 11b, 12b are formed into flat surfaces, however, they may be formed into curved surfaces such as cylindrical surfaces. In the electromagnetic head slider shown in FIG. 3, it is not always necessary to constitute as a negative pressure slider having the groove 3 formed between the rails 11, 12 and the groove width extending section 13a illustrated in FIG. 1.

In the electromagnetic head slider shown in FIG. 2, an edge portion of the outer periphery on the air delivery side, the floating height of which is relatively small as compared with that at the air entrance side, is chamfered in such a manner that the length "b" in the air flow direction is not less than 6 μm, and the depth "c" is not less than 0.27 μm. Consequently, it is possible to avoid the occurrence of a problem in which a sharp edge at the air delivery side of the head slider collides with the magnetic recording medium. Therefore, the shock resistance property can be enhanced.

Figure 4:
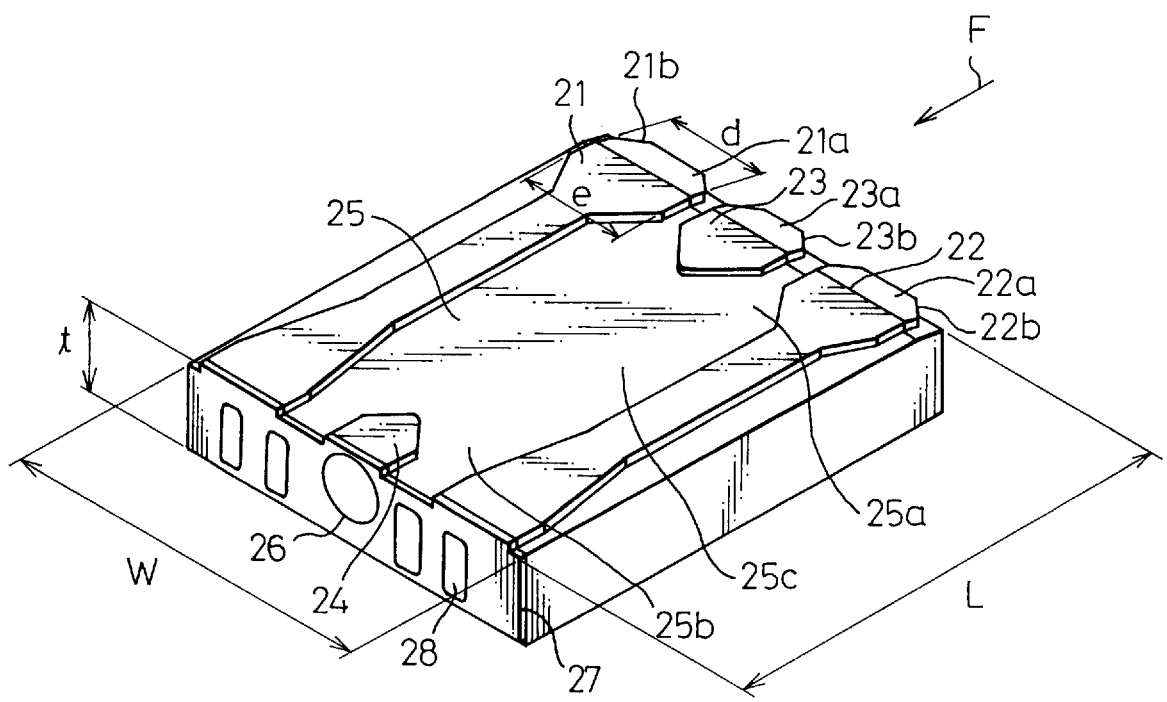
FIG. 4 is a perspective view showing an example of the invention.

With reference to some embodiments of the present invention will be explained as follows. FIG. 4 is a perspective view showing an embodiment of the present invention similar to that of FIG. 1. Dimensions of the electromagnetic head slider of this embodiment are described as follows. The length L in the air flow direction is 2 mm, the width W is 1.6 mm, and the thickness t is 0.4 mm.

In FIG. 4, numerals 21, 22 are side rails for generating a floating force, which are provided on a surface opposed to the magnetic recording medium (not shown) in the direction of an air flow F generated by the rotation of the magnetic recording medium. Between the side rails 21 and 22 on the air entry side, there is provided a front center rail 23 for generating a floating force. Between the side rails 21 and 22 on the air delivery side, there is provided a rear center rail 24.

There are provided inclined surfaces 21a, 22a, 23a in the portions on the air entry side on the floating surfaces of the rails 21, 22, 23. Corner portions 21b, 22b, 23b at the front edges on the air entry side of the rails 21, 22, 23 are greatly cut away, so that linear portions at the air entry side ends of the rails 21, 22, 23 are reduced.

In this case, the inclined surfaces 21a, 22a, 23a are formed in such a manner that the inclination angle θ is approximately 1.5° and the length (a) in the air flow direction is approximately 150 μm. Air entry side portions of the rails 21, 22, 23 are formed in such a manner that the width "e" of the non-inclined surfaces close to the inclined surfaces 21a, 22a, 23a of the rails 21, 22, 23 is not larger than the width "d" of the inclined surfaces 21a, 22a, 23a of the floating surfaces of the rails 21, 22, 23 (i.e., e≦d).

A shallow groove 25, the depth of which is about 4 μm, is formed between the rails 21 and 22 except for the portions where the front and rear rails 23, 24 are formed. There is provided a groove width extending section 25a in the groove 25, wherein the groove width is gently extended in the groove width extending section 25a when a view is taken from the air entry side to the air delivery side.

In this embodiment, in the groove 25, there is further provided with a groove width contracting section 25b in which the groove width is contracted when a view is taken from the air entry side to the air delivery side. Furthermore, in the groove 25, there is provided with a constant groove width section 25c which connects the groove width contracting section 25b with the groove width extending section 25a.

Numeral 26 is an electromagnetic head integrally attached onto an end surface of the central rear portion (rear center rail 24) of the magnetic head slider. In this embodiment, an MR thin film head is used. This electromagnetic head 26 is covered with a protective film 27. In this connection, numeral 28 is a connecting terminal of the electromagnetic head 26.

Figure 5:
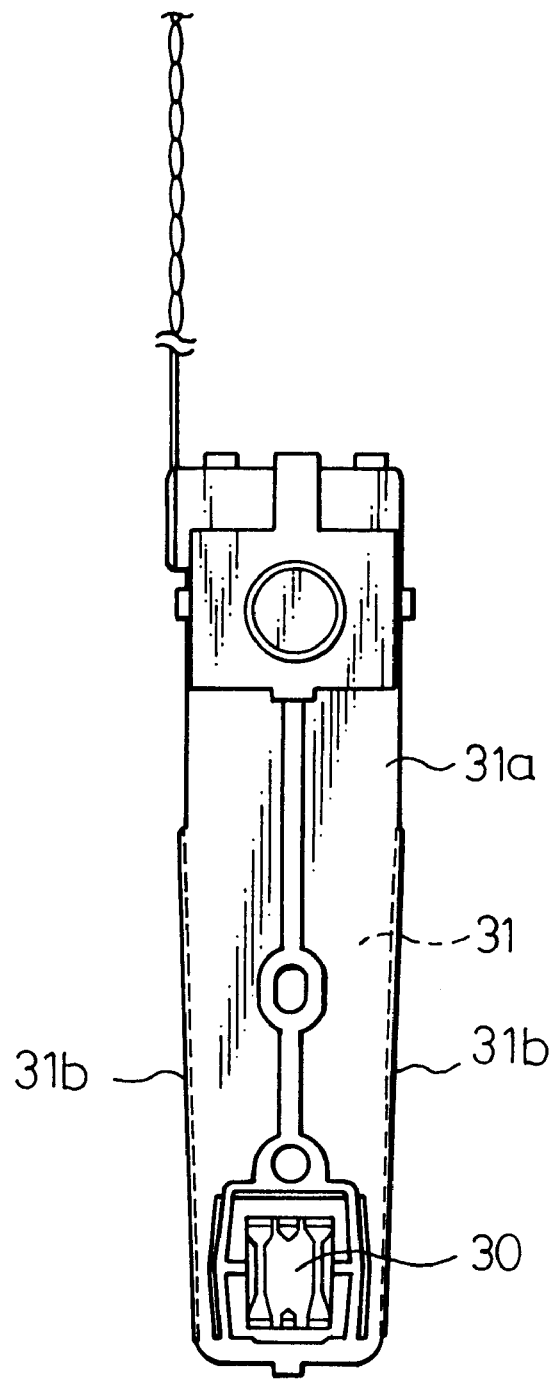
FIG. 5 is a schematic illustration for explaining a condition in which the electromagnetic head slider is attached to a gimbal spring.
Figure 6:
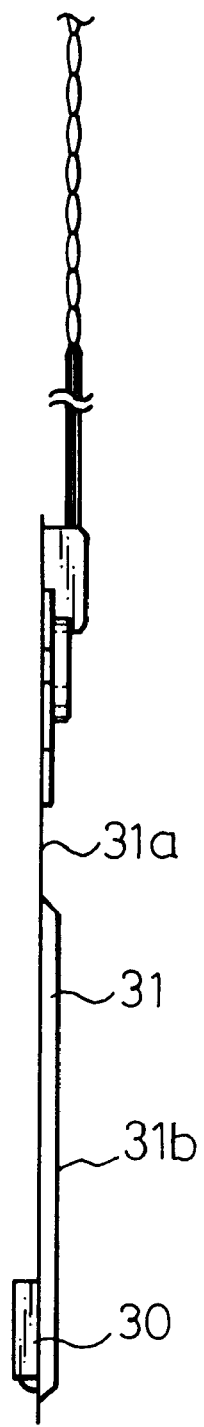
FIG. 6 is a right side view of FIG. 5.

As illustrated in FIGS. 5 and 6, the electromagnetic head slider 30 constructed in the above manner is tiltably attached to a flexure portion formed at the fore end of a gimbal spring 31. In the gimbal spring 31, a flexible resilient portion 31a is provided only in a portion close to a base of the gimbal spring 31, and flanges 31b are formed by folding in the respective side portions of the middle of the gimbal spring 31, so that the rigidity of the gimbal spring 31 is enhanced. The base portion of the gimbal spring 31 opposite to the magnetic head slider 30 is mounted on a head arm of the magnetic disk head.

Figure 7:
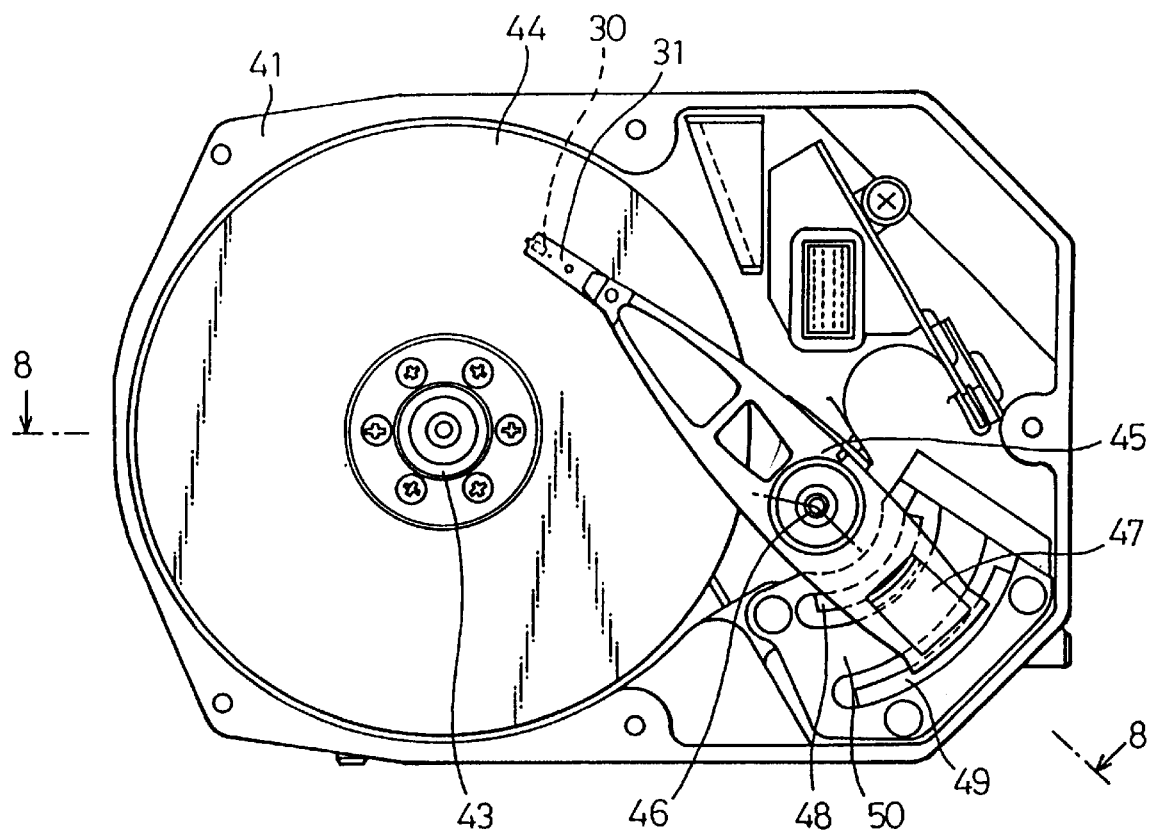
FIG. 7 is a view showing an example of the electromagnetic disk unit to which the magnetic head slider of the example shown in FIG. 4 is attached.
Figure 8:
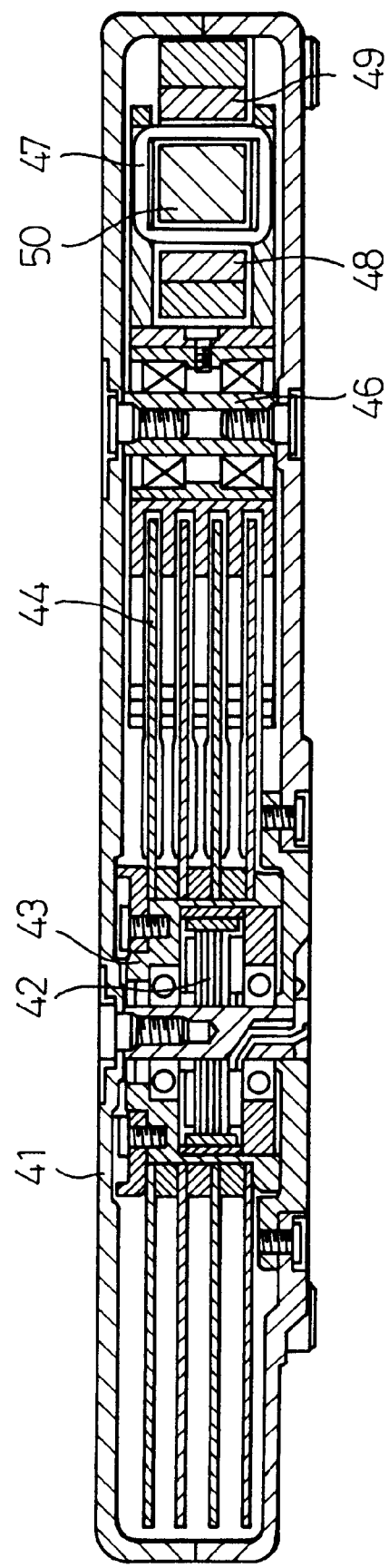
FIG. 8 is a sectional view showing an outline of the construction on the A—A section in FIG. 7.

In FIGS. 7 and 8, an embodiment of the magnetic disk unit is shown, to which the above-mentioned magnetic head slider is attached. FIG. 7 shows a condition in which an upper cover of the disk enclosure is removed. In FIGS. 7 and 8, numeral 41 is a disk enclosure. A spindle 43 rotated by a spindle motor 42 is vertically attached on the base of this disk enclosure 41, and a plurality of magnetic disks (magnetic recording medium) 44 are stacked at regular intervals and mounted on the spindle 43.

Numeral 45 is a head arm rotatably attached onto the base of the disk enclosure 41 through a shaft 46. A moving coil 47 is attached to one of the rotational end portions of the head arm 45, and the electromagnetic head slider 30 is attached to the other rotational end portion of the head arm 45 through the gimbal spring 31. The moving coil 47 is provided in a magnetic gap in the magnetic circuit formed by stationally magnets 48, 49 and a yoke 50.

The disk unit in this embodiment is of the CSS (contact-start-stop) type. Therefore, the electromagnetic head slider 30 is attached to the head arm 45 in such a manner that the magnetic disk 44 is pushed by the magnetic head slider 30 with a spring force not more than 2.0 g (preferably about 1.5 g).

Next, the operation of the above embodiment will be explained as follows. When the spindle motor 42 starts, the magnetic disk 44 mounted on the spindle 43 is rotated. When air flows in the direction F into the electromagnetic head slider 30, a floating force is generated on the floating surfaces of the rails 21, 22, 23 so that the head slider 30 is separated from the magnetic disk 44. At the same time, in the groove width extending section 25a of the groove 25, flowing air is expanded, and a negative pressure is generated so that the electromagnetic head slider 30 is attracted to the side of the magnetic disk 44.

Then, the electromagnetic head slider 30 floats to a height at which the forces of both directions are balanced. In this case, the forces of both directions include not only the floating and attracting forces generated by the air flow but also the spring force exerted by the gimbal spring 31. Then the magnetic head slider 30 stops at the height.

In this embodiment, as shown in FIG. 4, the corner portions 21b, 22b, 23b at the front edges on the air entry side of the rails 21, 22, 23 are greatly cut away, so that linear portions at the air entry ends of the rails 21, 22, 23 are reduced. Further, there are provided inclined surfaces 21a, 22a, 23a. Accordingly, the dust seldom adheres onto the floating surfaces of the rails 21, 22, 23. Especially when the dust adheres onto the non-inclined surface close to the inclined surfaces 21a, 22a, 23a, an amount of floating height greatly fluctuates. However, since the width "e" of the non-inclined surface is not larger than the width "d" of the inclined surfaces 21a, 22a, 23a, (i.e., e≦d) an amount of dust adhering onto the non-inclined surface is small.

Further, it is constructed in such a manner that the inclination angle θ of the inclination surfaces 21a, 22a, 23a is 1.5°, and that the length "a" in the air flow direction is 150 μm. Therefore, even when the dust adheres onto the surfaces, a decrease of the floating height is negligibly small. For this reason, although an amount of floating height is small, the floating height can be stably maintained.

According to the result of an experiment, it has been found that this effect can be enhanced when the inclination surfaces 11a, 12a are provided in the following manner: The inclination angle θ is not more than 3°. It is preferable that the inclination angle θ is not less than 0.5° and not more than 3° (0.50≦θ≦3°). The length a in the air flow direction is not less than 50 μm. It is preferable that the length is not less than 50 μm and smaller than a half of the length of the magnetic head slider in the air flow direction (50 μm≦a≦L/2).

When an electric current is applied to the coil 47 under the above floating condition, a thrust is generated in the coil 47 in the magnetic gap. Therefore, the head arm 45 is rotated around the shaft 46, and the electromagnetic head slider 30 attached to the head arm 45 through the gimbal spring 31 moves on the magnetic disk 44, so that the electromagnetic head 26 can be moved onto a desired track.

Figure 11:
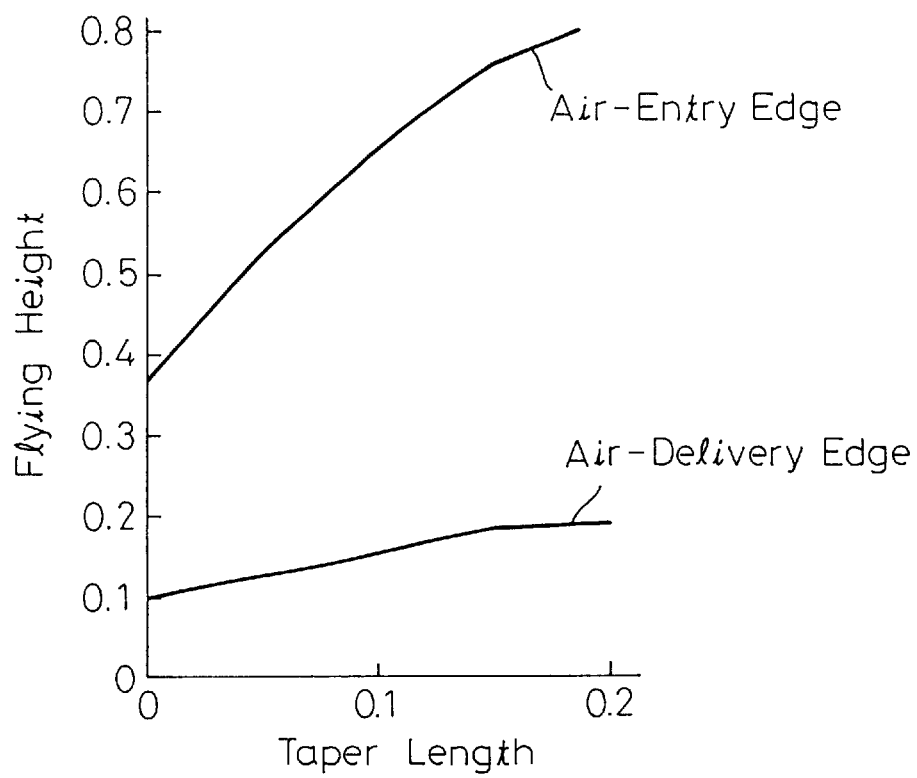
FIG. 11 is a graph showing an experimental result of a relationship between the taper length and the floating height of the head slider.
Figure 12:
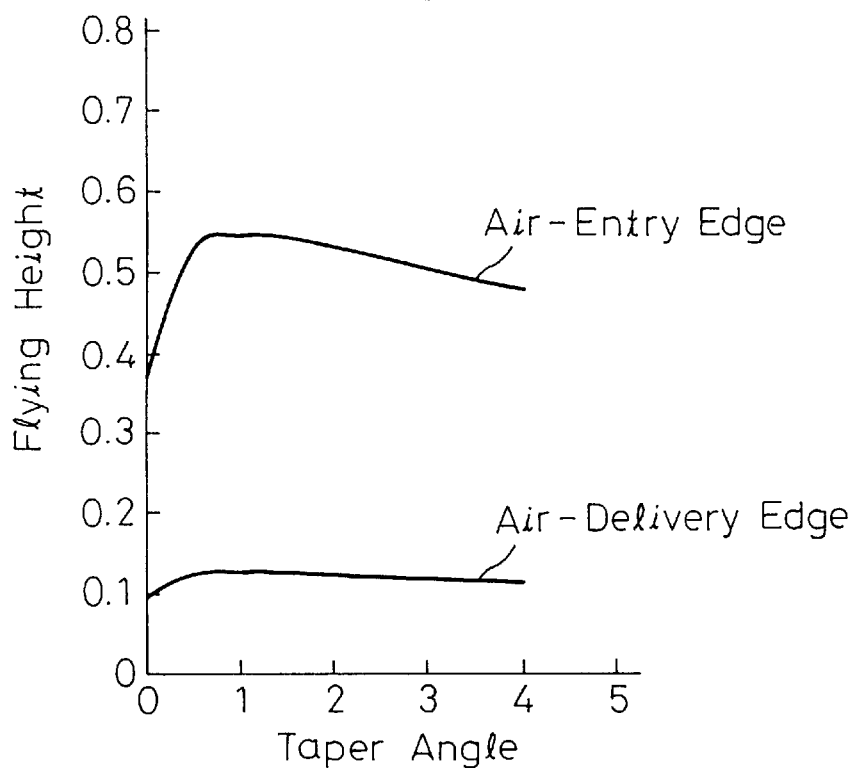
FIG. 12 is a graph showing an experimental result of a relationship between the taper angle and the floating height of the head slider.

FIGS. 11 and 12 show experimental results of the floating height of the magnetic head slider. As shown in FIG. 11, if the taper length is increased (taper angle being constant 3°), the amount of floating height are also increased both at the air-entry edge and the air-delivering edge, respectively, of the magnetic head slider. However, as shown in FIG. 12, if the taper angle is increased (taper length being constant=50 μm), the amounts of floating height are first increased, but gradually reduced thereafer at the air-entry and air-derivery edges.

Figure 9:
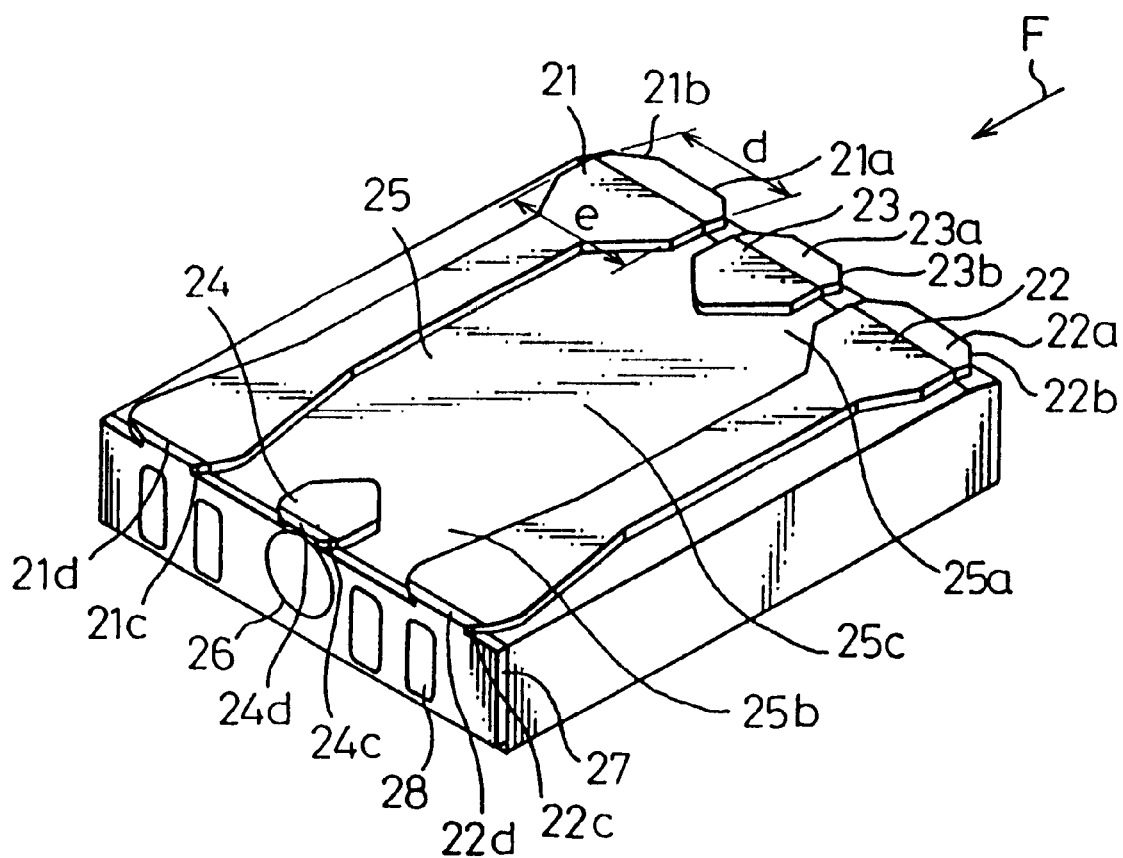
FIG. 9 is a perspective view showing an example of the invention.

FIG. 9 is a perspective view showing another embodiment of the invention shown in FIGS. 2 and 3. The electromagnetic head slider of this example has many points in common with the embodiment shown in FIG. 4. Therefore, like parts in each of FIGS. 4 and 9 are identified by the same reference character, and the explanations are omitted here.

The characteristics of the construction illustrated in FIG. 9 are as follows. The edge portions of the outer peripheries on the air delivery side of the floating surfaces of the rails 21, 22, 24 are chamfered in the same manner as those of the construction illustrated in FIG. 3. However, in this embodiment, after the corner portions 21c, 22c, 24c on the air delivery side of the floating surfaces of the rails 21, 22, 24 have been rounded, they are chamfered, as shown at 21d, 22d, 24d. The chamfered portions 21d, 22d, 24d are formed in the above manner in this embodiment. In this connection, the configurations of the chamfered portions 21d, 22d, 24d are not necessarily planes (linear chamfering), but they may be formed into curved surfaces such as cylindrical surfaces (arcuate chamfering). This embodiment includes all of the features of constructions shown in FIG. 4, except for the chamfered portions 21d, 22d, 24d, and therefore a negative pressure slider is thus constructed.

As described above, the chamfered portions 21d, 22d, 24d are formed in the following manner: The length "b" (FIG. 3) in the air flow direction F is not less than 6 μm (it is preferable that the length "b" is not less than 6 μm and not more than 100 μm), (i.e., 6 μm≦b≦100 μm), and the depth "c" is not less than 0.27 μm (it is preferable that the depth "c" is not less than 0.27 μm and not more than the length "b" of the air flow direction) (i.e., 0.27≦c≦b). When the edge portions of the outer peripheries on the air delivery side, the floating height of which is relatively small as compared with that at the air entrance side, are subjected to chamfering in the manner described above, the sharp edge portions do not collide with the magnetic disk, so that the shock resistance property can be enhanced.

Figure 10:
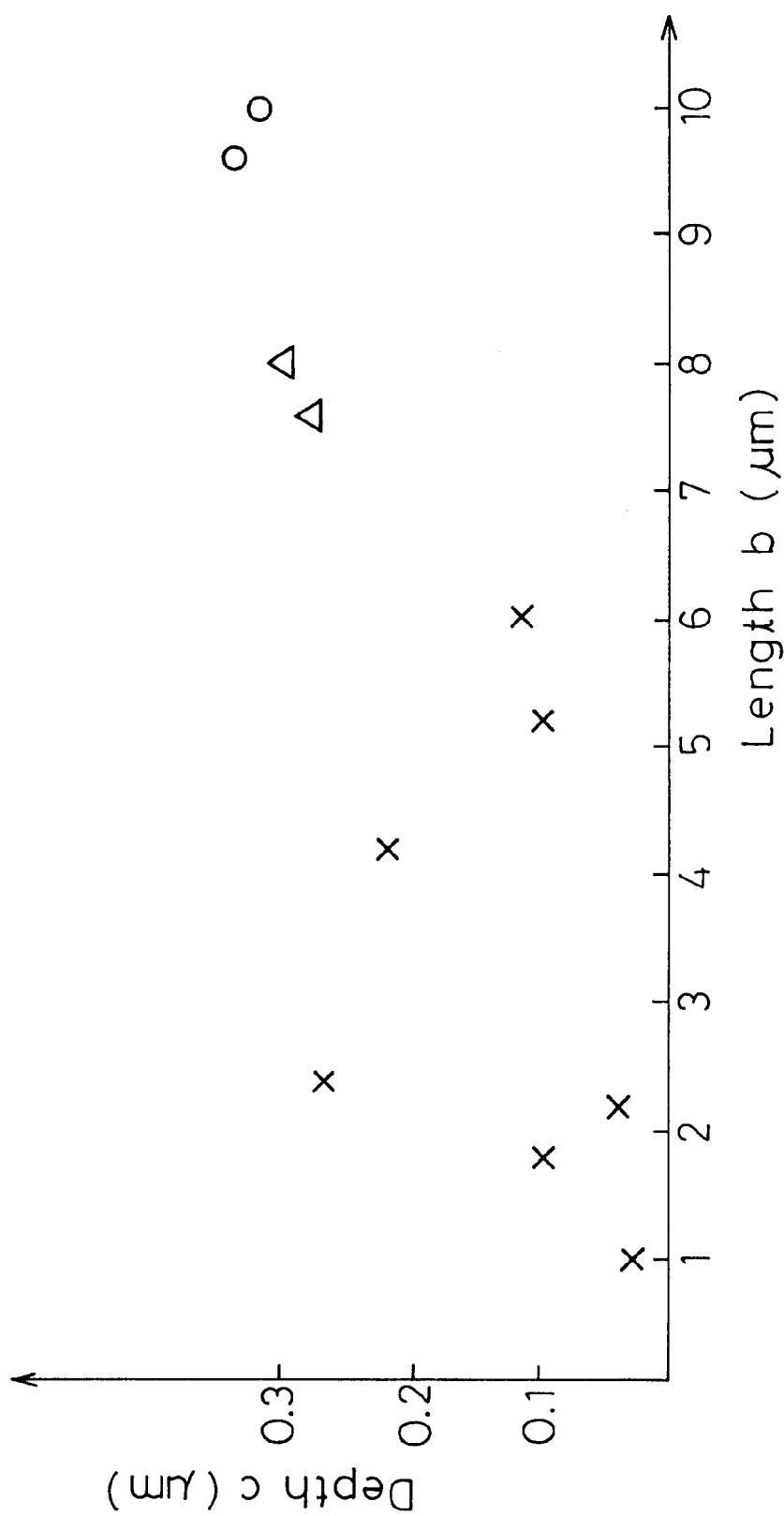
FIG. 10 is a view for explaining the effect of chamfering conducted on the edge portion.

FIG. 10 is a graph of experimental data showing a change in the shock resistance property when the edge portions of the outer peripheries on the air delivery side of the rail floating surfaced were chamfered. In this connection, the shock resistance property was changed a little by the circumferential speed and the yaw angle. The experimental data shown in FIG. 10 was obtained under the following measuring condition.

| | |
|---|---|
| Circumferential speed | 20 m/s |
| Yaw angle | −17.8° |
| Exciting direction | Seeking direction |
| Exciting position | Head arm |
| Fundamental configuration | Example shown in FIG. 4, wherein the inclination surfaces 21a, 22a, 23a are not provided |

In FIG. 10, the mark × represents a point at which a dent was made on the magnetic disk even when a shock acceleration of not more than 600G was impressed upon the electromagnetic head slider, the mark Δ represents a point at which a dent was made on the magnetic disk when a shock acceleration of 700G was impressed upon the electromagnetic head slider, and the mark ○ represents a point at which a dent was made on the magnetic disk when a shock acceleration of 800G was impressed upon the electromagnetic head slider. When the corner portions on the air delivery side of the floating surfaces of the rails 21, 22, 24 were rounded as shown in FIG. 9, the shock resistance property was more enhanced.

It should be noted that the present invention is not limited only to the above embodiments. For example, it is sufficient that two rails are provided. An electromagnetic head other than an MR thin film head may be used, for example, an inductive thin film head may also be used.

As explained above, according to the embodiment shown in FIGS. 1 and 4, the inclination surface is constructed in such a manner that the inclination angle θ of the inclination surfaces is not more than 3° and that the length "a" in the air flow direction is not less than 50 μm. Therefore, even when the dust adheres onto the surfaces, a decrease of the floating height is negligibly small. For this reason, although an amount of floating height is small, the floating height can be stably maintained in the electromagnetic head slider of the present invention.

According to the embodiment shown in FIGS. 1, 2 and 9, the chamfered portions are formed in such a manner that the length "b" in the air flow direction is not less than 6 μm and that the depth "c" is not less than 0.27 μm. When the edge portions of the outer peripheries on the air delivery side, the floating height of which is small, are subjected to chamfering as described above, the sharp edge portions do not collide with the magnetic recording medium, so that the shock resistance property can be enhanced in the electromagnetic head slider of the present invention.

We claim:

1. An air-bearing head slider for supporting an electromagnetic transducer opposite to a rotating magnetic disk, said slider comprising:

a slider body having a surface opposite to said rotating magnetic disk, said surface having an air-entry side and an air-delivery side;

a first and second rail provided on said surface of said slider body, each of said first and second rails having a floating surface opposite to said rotating magnetic disk for generating a floating force, each of said first and second rails extending in parallel along a direction of air flow generated by the rotation of said magnetic disk and having a leading edge at said air-entry side and a trailing edge at said air delivery side;

a relatively shallow groove cooperatively defined between said first and second rails and extending from said air-entry side of said slider body to said air-delivery side of said slider body;

each of said first and second rails having an edge portion on said floating surface at said air-delivery side being chamfered in such a manner that a length of said chamfered portion in the air-flow direction is not less than 6 μm and not more than 100 μm and a depth of said chamfered portion is not less than 0.27 μm, and not more than the length of said chamfered portion to form a dull angle at said trailing edge of each of said first and second rails; and an inclined surface formed on said air-entry side of said floating surface of each of said first and second rails, an inclination angle of said inclined surface being generally between 2.5 and 3°.

2. A head slider as set forth in claim 1, wherein said chamfered portion is defined by a inclined flat surface.

3. A head slider as set forth in claim 1, wherein said shallow groove has at least one width-enlarged portion at which the width of said shallow groove is enlarged when a view is taken from said air-entry side to the air-delivery side, so that a negative pressure is generated by said width-enlarged portion in such a manner that said slider body is attracted to said rotating magnetic disk.

4. A head slider as set forth in claim 3, wherein a length of each said inclined surface is not less than 50 μm and not more than a half of a length of each of said first and second rails in the direction of air flow.

5. A head slider as set forth in claim 1, wherein:

each of said first and second rails has a predetermined length, said head slider further comprising a front and a rear center rail between said first and second rails, a total length of said front and rear center rails being less than said predetermined length, said front and rear center rails generating a floating force between said first and second rails at said air-entry side of said slider body;

said first and second rail cooperatively defining first and second air-inlet grooves communicating with said shallow groove, said first air-outlet groove being defined between said first mil and said front and rear center rails and said second air-outlet groove being defined between said second rail and said and front and rear center rails.

6. A head slider as set forth in claim 1, further comprising:

a front and a rear center rail provided on said surface of said slider body between said first and second rails, a combined length of said front and rear center rails being less than said predetermined length, said front and rear center rails generating a floating force between said first and second rails at said air-delivery side of said slider body; and a first and a second air-outlet groove communicating with said shallow groove, said first air-outlet groove being defined between said first rail and said front and rear center rails and said second air-outlet groove being between said second rail and said front and rear center rails.

7. A head slider as set forth in claim 1, further comprising a spring supporting means for supporting said slider body in such a manner that said slider body is urged toward said rotating magnetic disk by not more than 2.0 g.

8. An air-bearing head slider for supporting an electromagnetic transducer opposite to a rotating magnetic disk, said slider comprising:

a slider body having a surface opposite to said rotating magnetic disk, said surface having an air-entry side and an air-delivery side;

a first and a second rail provided on said surface of said slider body and having a floating surface opposite to said rotating magnetic disk for generating a floating force, each of said first and second rails extending in parallel along a direction of air flow generated by the rotation of said magnetic disk;

a relatively shallow groove cooperatively defined between said first and second rails, said shallow groove extending from said air-entry side of said slider body to said air-delivery side of said slider body;

each of said first and second rails having a leading edge at said air-entry side of said slider body and a trailing edge at said air-delivery side of said slider body, each said trailing edge being chamfered in such a manner that a length of said chamfered portion in the air-flow direction and a depth of said chamfered portion form a dull angle, and an inclined surface formed on said air-entry side of said floating surface of each of said first and second rails, an inclination angle of said inclined surface being generally between 2.5 and 3°.

9. A head slider as set forth in claim 8, wherein said chamfered portion is defined by a inclined flat surface.

10. A head slider as set forth in claim 8, wherein said shallow grove has at least one width-enlarged portion at which the width of said shallow groove is enlarged when a view is taken from said air entry side to said air-delivery side, so that a negative pressure is generated by said width-enlarged portion in such a manner that said slider body is attracted to said rotating magnetic disk.

11. A head slider as set forth in claim 8, wherein a length of each said inclined surface is not less than 50 μm and not more than a half of a length of each of said first and second rails in the direction of air flow.

12. A head slider as set forth in claim 8, wherein each of said first and second rails has a predetermined length;

said head slider further comprising a front and a rear center rail provided on said surface of said slider body between said first and second rails, a total length of said front and rear center rails being less than said predetermined length, said front and rear center rails generating a floating force between said first and second rails at said air-entry side of said slider body;

a first and a second air-inlet groove communicating with said shallow groove, said first air-inlet groove being defined between said first rail and said front and rear center rails and said second air-inlet groove being defined between said second rail and said front and rear center rails.

13. A head slider set forth in claim 8, wherein each of said first and second rails has a predetermined length, said head slider further comprising a front and a rear center rail provided on said surface of said slider body between said first and second rails, a total length of said front and rear center rails being less than said predetermined length, said front and rear center rails generating a floating force between said first and second rails at said air-delivery side of said slider body;

a first and a second air-inlet groove communicating with said shallow groove, said first air-inlet groove being defined between said first rail and said front and rear center rails and said second air-inlet groove being defined between said second rail and said front and rear center rails.

14. A head slider as set forth in claim 8, further comprising a spring supporting means for supporting said slider body in such a manner that said slider body is urged toward said rotating magnetic disk by not more than 2.0 g.

15. An air-bearing head slider for supporting an electromagnetic transducer opposite to a rotating magnetic disk, said slider comprising:

a slider body having a surface opposite to said rotating magnetic disk, said surface having an air-entry side and an air-delivery side;

a first and a second rail provided on said surface of said slider body, each of said first and second rails has a floating surface opposite to said rotating magnetic disk for generating a floating force, each of said first and second rails has a leading edge at said air-entry side of said slider body and a trailing edge at said air-delivery side, each of said first and second rails extends in parallel along a direction of air flow generated by the rotation of said magnetic disk;

said first and second rails cooperatively defining a relatively shallow groove therebetween, said shallow groove extending from said air-entry side to said air-delivery side;

said shallow groove having a width-enlarged portion at which the width of said shallow groove is enlarged when a view is taken from said air-entry side to said air-delivery side, so that a negative pressure is generated by said width-enlarged portion in such a manner that said slider body is attracted to the surface of said rotating magnetic disk;

an inclined surface formed on said air-entry side of said floating surface of each of said first and second rails, an inclination angle of said inclined surface being generally between 2.5 and 3°, and a length of said inclined surface being not less than 50 µm and not more than a half of a length of each of said first and second rails in the direction of air flow, so that a floating height is stable at a constant value even when dust adheres to said surface of said slider body; and a front and a rear center rail provided on said surface of said slider body between said first rail and said second rail, a total length of said front and rear center rails being less than said predetermined length, said front and rear center rails generating a floating force at an air delivery side between said first and second rail; and a first and a second air-outlet groove communicating with said shallow groove, said first air-inlet groove being defined between said first rail and said front and rear center rails and said second air-inlet groove being between said second rail and said front and rear center rails.

16. A head slider as set forth in claim 15, further comprising a spring supporting means for supporting said slider body in such a manner that said slider body is urged toward said rotating magnetic disk by not more than 2.0 g.

17. An air-bearing head slider for supporting an electromagnetic transducer opposite to a rotating magnetic disk, said slider comprising:

a slider body having a surface opposite to said rotating magnetic disk, said surface having an air-entry side and an air-delivery side;

a first and a second rail provided on said surface of said slider body, each of said first and second rail having a predetermined length and a floating surface opposite to the rotating magnetic disk for generating a floating force, each of said first and second rails extending in parallel along a direction of air flow generated by the rotation of said magnetic disk, and having a leading edge at said air-entry side and a trailing edge at said delivery side;

a relatively shallow groove cooperatively defined between said first and second rails, said shallow groove extending from said air-entry side of said slider body to said air-delivery side of said slider body, said shallow groove having a width-enlarged portion at which the width of said shallow groove is enlarged when a view is taken from said air-entry side to said air-delivery side, so that a negative pressure is generated by said width-enlarged portion in such a manner that said slider body is attracted to the rotating magnetic disk; and an inclined surface formed on said air-entry side of said floating surface of each of said first and second rails, an inclination angle of said inclined surface being generally between 2.5° and 3.0° and a length of said inclined surface being 100 µm;

a front and a rear center rail provided on said surface of said slider body between said first and second rails, a total length of said front and rear center rails being less than said predetermined length, said front and rear center rails generating a floating force between said first and second rail at said air-entry side of said slider body; and a first and a second air-outlet groove communicating with said shallow groove, said first air-inlet groove being defined between said first rail and said front and rear center rails and said second air-inlet groove being between said second rail and front and rear center rails.

18. A head slider as set forth in claim 15, further comprising a spring supporting means for supporting said slider body in such a manner that said slider body is urged toward said rotating magnetic disk by not more than 2.0 g.

19. An air-bearing head slider for supporting an electromagnetic transducer opposite to a rotating magnetic disk, said slider comprising:

a slider body having a surface opposite to said rotating magnetic disk, said surface having an air-entry side and an air-delivery side;

a first and a second rail provided on said surface of said slider body, each of said first and second rails has a predetermined length and a floating surface opposite to the rotating magnetic disk for generating a floating force, each of said first and second rail extending in parallel along a direction of air flow generated by the rotation of said magnetic disk, and having a leading edge at said air-entry side and a trailing edge at said delivery side;

a relatively shallow groove cooperatively defined between said first and second rail, said shallow groove extending from said air-entry side of said slider body to said air-delivery side of said slider body, said shallow groove having a width-enlarged portion at which the width of said shallow groove is enlarged when a view is taken from said air-entry side to said air-delivery side, so that a negative pressure is generated by said width-enlarged portion in such a manner that said slider body is attracted to the rotating magnetic disk; and an inclined surface formed on said air-entry side of said floating surface of each of said first and second rails, an inclination angle of each said inclined surface being generally between 2.5° and 3.0° and a length of each said inclined surface being 100 µm;

a front and a rear center rail provided on said surface of said slider body between said first and second rail, a total length of said front and rear center rails being less than said predetermined length, said front and rear center rails generating a floating force between said first and second rail at said air-delivery side of said slider body; and a first and a second air-outlet groove communicating with said shallow groove, said first air-inlet groove being defined between said first rail and front and rear center rails and said second air-inlet groove being between said second rail and third front and rear center rails.

* * * * *